May 7, 1940.  A. S. T. LAGAARD  2,199,855

DOUGHNUT MACHINE

Filed June 30, 1939  6 Sheets-Sheet 1

Alexander S. T. Lagaard
By Caswell & Lagaard
Attorneys

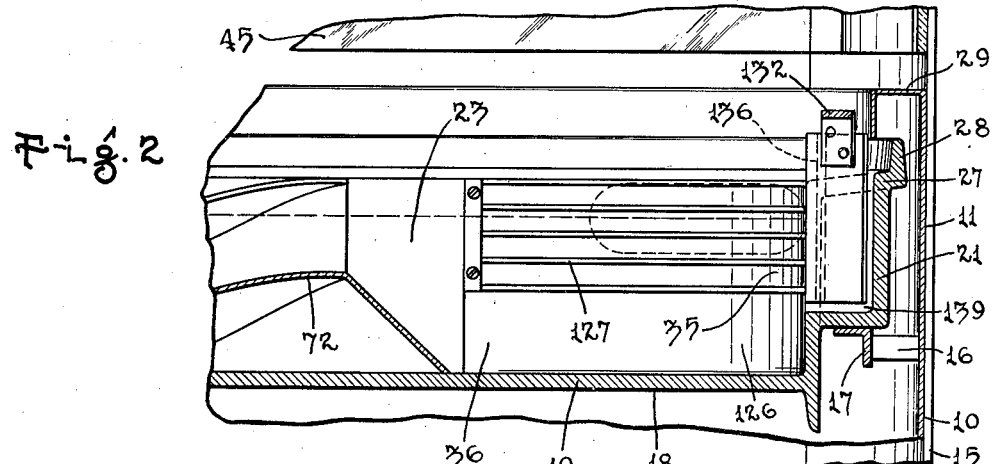
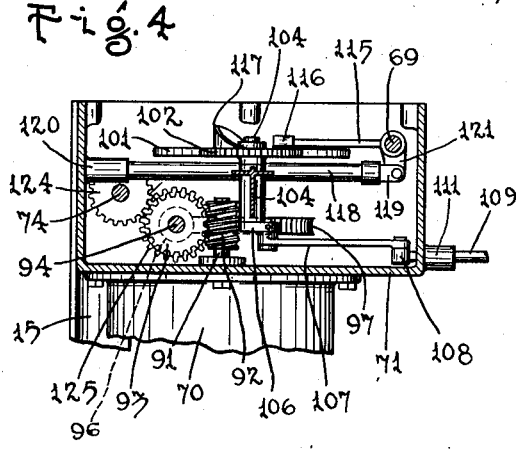
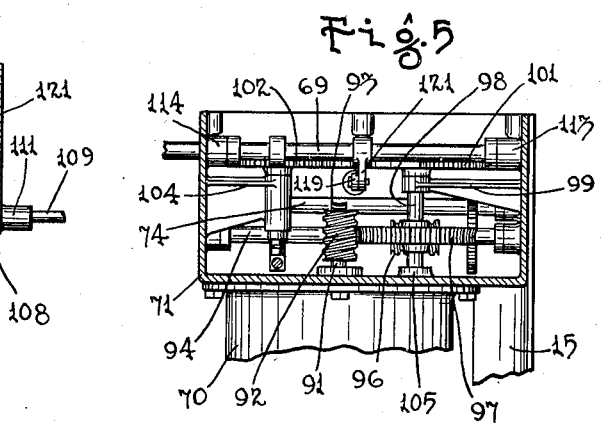
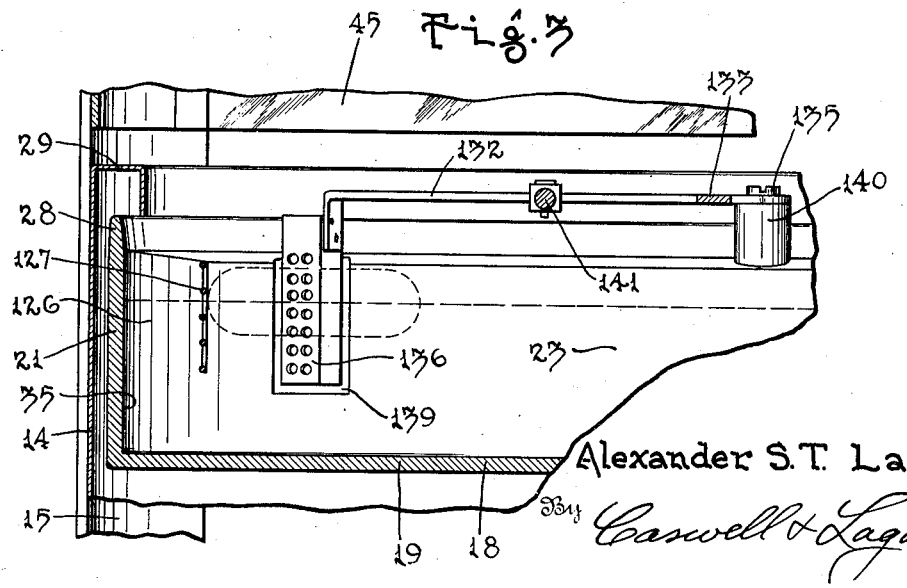

May 7, 1940.  A. S. T. LAGAARD  2,199,855
DOUGHNUT MACHINE
Filed June 30, 1939  6 Sheets-Sheet 3

Inventor
Alexander S. T. Lagaard
By Caswell & Lagaard
Attorneys

May 7, 1940.  A. S. T. LAGAARD  2,199,855
DOUGHNUT MACHINE
Filed June 30, 1939  6 Sheets-Sheet 4
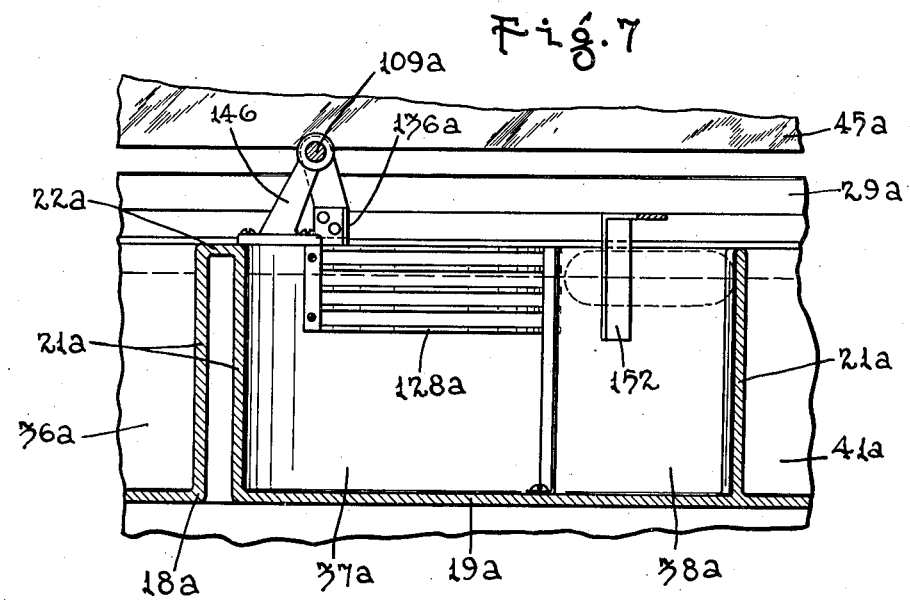
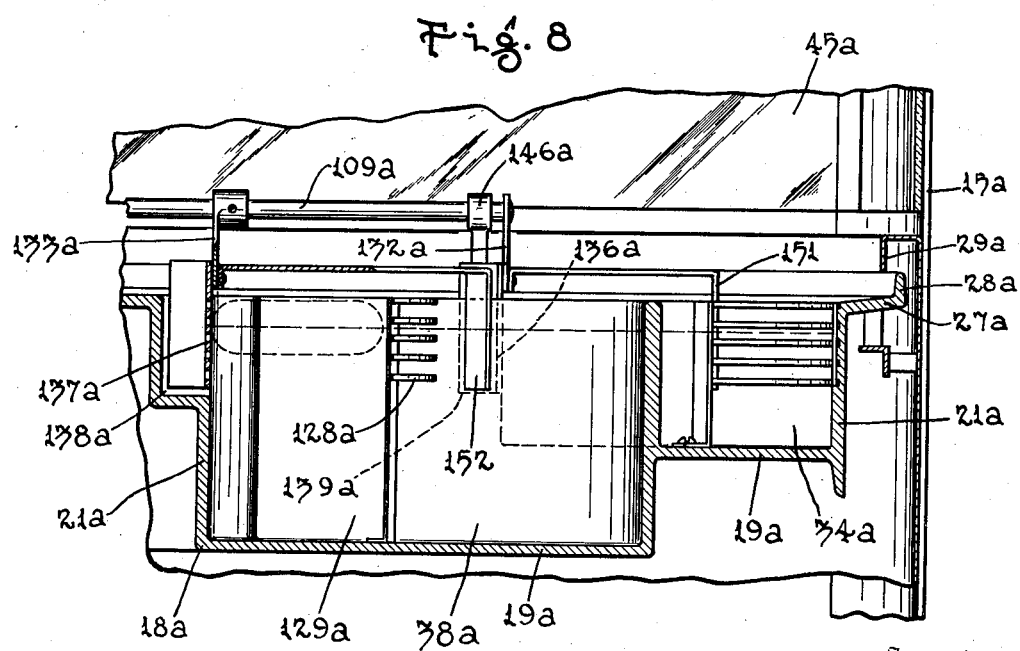
Inventor
Alexander S. T. Lagaard

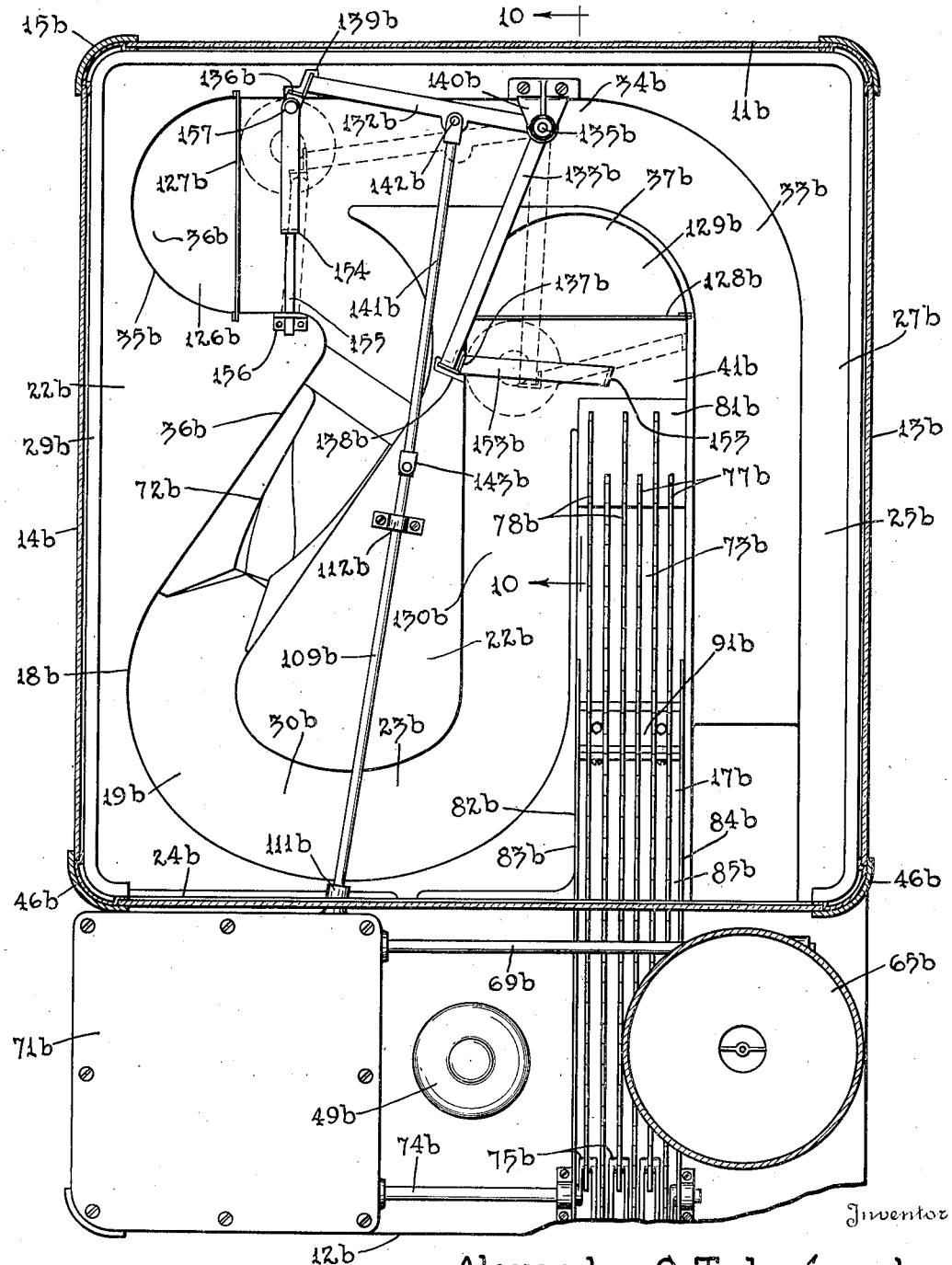

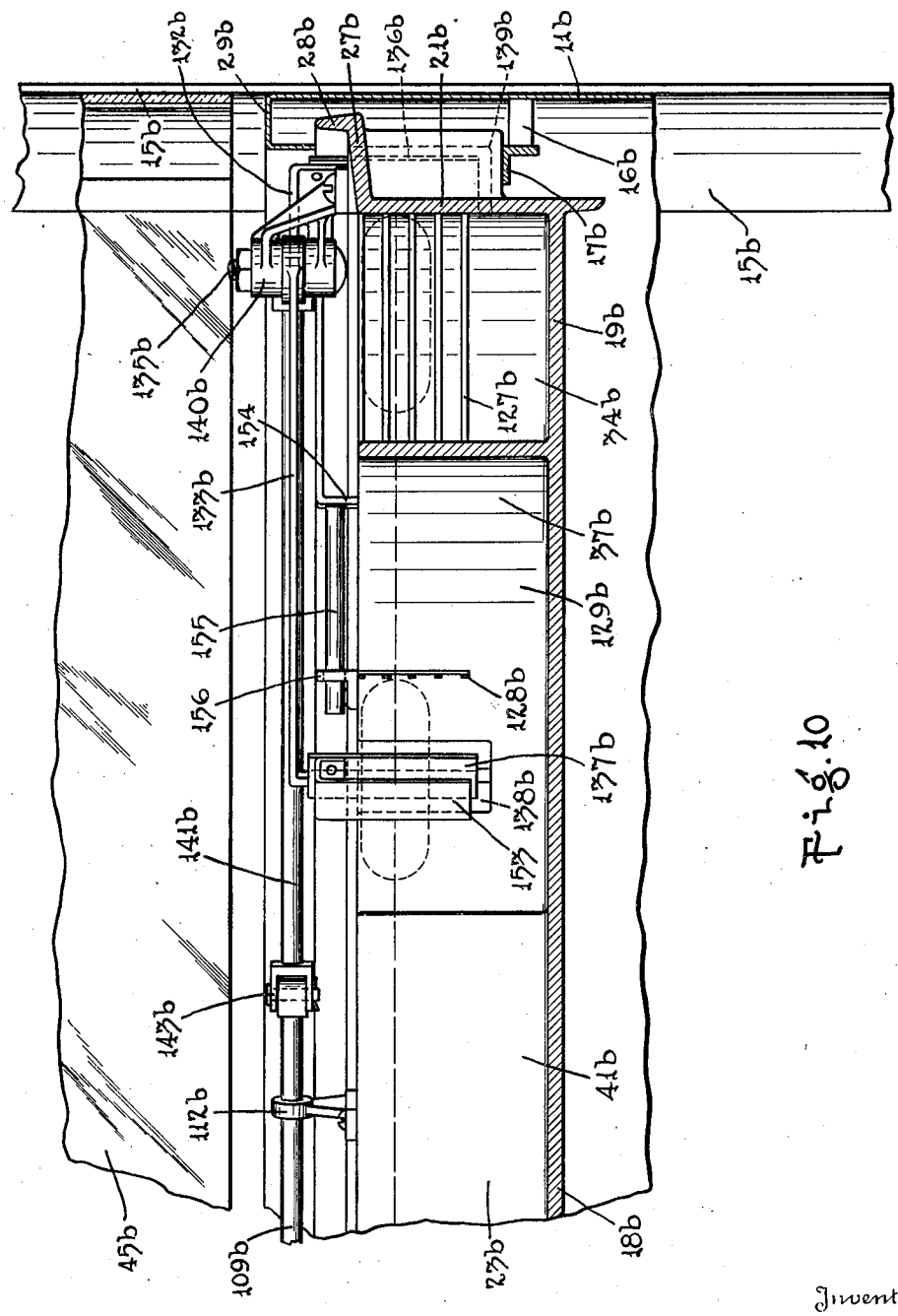

Patented May 7, 1940

2,199,855

UNITED STATES PATENT OFFICE 2,199,855

DOUGHNUT MACHINE

Alexander S. T. Lagaard, Minneapolis, Minn., assignor to Dough-King, Inc., Minneapolis, Minn., a corporation of Minnesota Application June 30, 1939, Serial No. 282,111

12 Claims. (Cl. 53—7)

My invention relates to doughnut machines and particularly to doughnut machines in which the doughnuts are progressed along a channel in a kettle throughout a circuitous course by means of the flow of the cooking liquid.

An object of the invention resides in providing a control device for a doughnut machine of such character by means of which the rate of travel of the doughnuts along the channel may be regulated.

Another object of the invention resides in providing a doughnut machine having a channel formed with an off-set or bend therein and in disposing said control device at the off-set or bend.

A still further object of the invention resides in constructing the channel so that the same has a locality where the doughnuts cease to travel and in providing means for shifting the doughnut from such locality to a locality where the doughnuts continue to travel.

Another object of the invention resides in constructing the channel with a pocket in which the rate of flow is a minimum and in which the doughnuts remain stationary and in providing means for shifting the doughnuts out of the pocket and into the channel.

Another object of the invention resides in controlling the travel of the doughnuts along the channel by shifting the doughnuts laterally of the direction of flow of the cooking liquid in the channel.

Other objects of the invention reside in the novel combination and arrangement of parts and in the details of construction hereinafter illustrated and/or described.

In the drawings:

Fig. 2 is an elevational sectional view taken on line 2—2 of Fig. 1 and drawn to a greater scale.

Fig. 3 is an elevational sectional view taken on line 3—3 of Fig. 1 and drawn to the same scale as Fig. 2.

Fig. 4 is an elevational sectional view taken on line 4—4 of Fig. 1 and drawn to the same scale as Fig. 1.

Fig. 5 is an elevational sectional view taken on line 5—5 of Fig. 1 and drawn to the same scale as Fig. 4.

Fig. 7 is an elevational sectional view taken on line 7—7 of Fig. 1 and drawn to a greater scale.

Fig. 8 is a view similar to Fig. 7 taken on line 8—8 of Fig. 1.

Fig. 9 is a view similar to Fig. 1 of still another form of the invention.

Fig. 10 is an elevational sectional view taken on line 10—10 of Fig. 1 and drawn to a greater scale.

Figure 1:
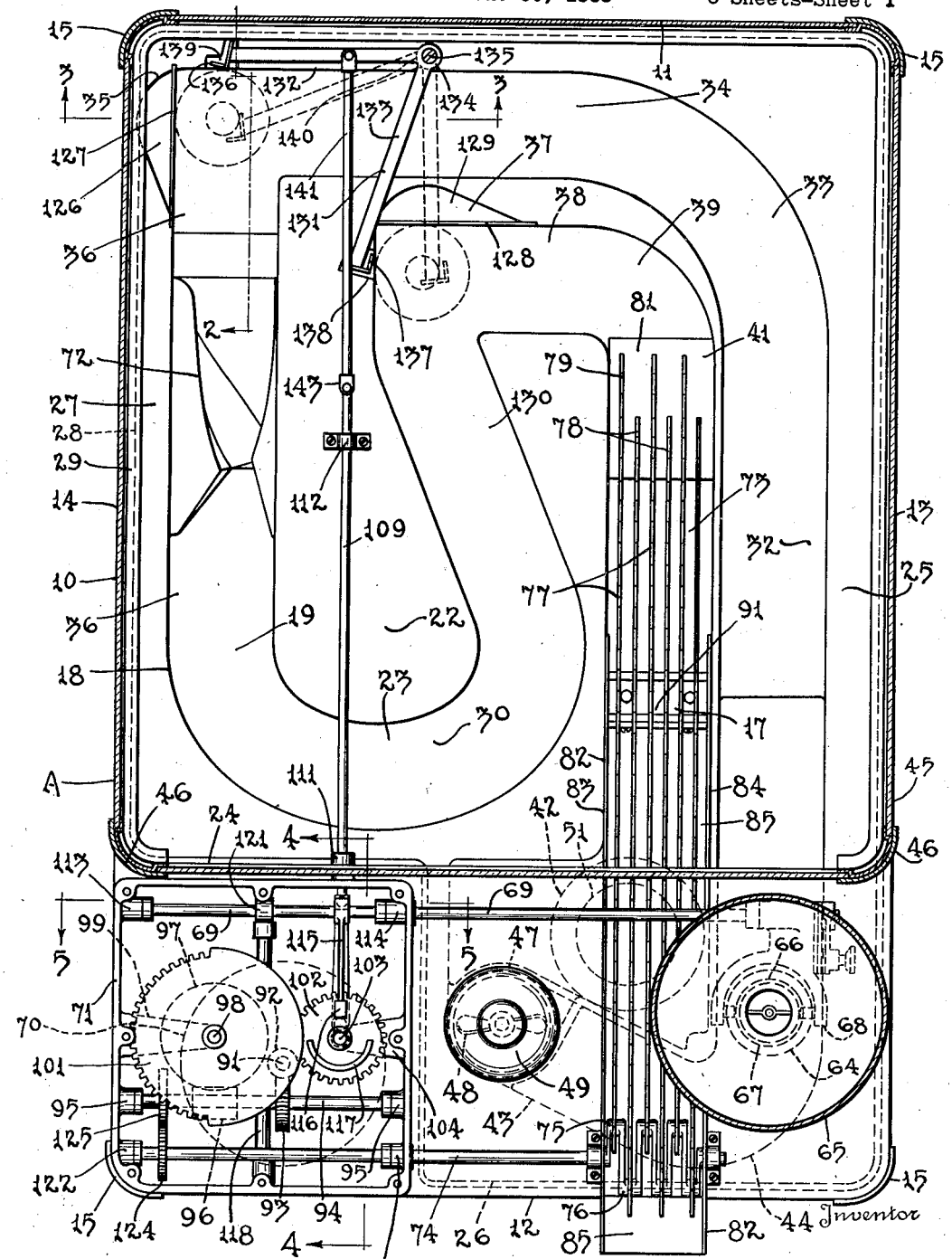
Fig. 1 is a plan sectional view of a doughnut machine illustrating an embodiment of my invention.

In the drawings I have shown a doughnut machine A which consists of a case 10 constructed with end walls 11 and 12 and side walls 13 and 14 connected therewith. The case includes uprights 15 disposed at the outer corners of the same which extend throughout the height of the case and to which the various walls are attached. Secured to the various uprights 15, by means of brackets 16, are angle frame members 17, which stiffen the case and which serve as supports for the kettle of the invention.

Within the case 10 is disposed a cooking kettle 18 which is preferably of cast material and which is constructed with a bottom 19 and with vertical walls 21 extending upwardly therefrom. The vertical walls are connected at their upper ends with upper walls 22 and the various walls are so arranged as to form a channel 23, which extends through the major portion of the kettle and which provides a way along which the doughnuts may travel. The kettle 18 has one corner of the same removed as designated at 24, leaving a main portion 25 of the width of the case 10 and of a length equal to about two-thirds of the length of the same. This construction also provides an extension 26 to the kettle which extends up to the end wall 12. The kettle 18 is constructed with a ledge 27 extending about the margin of the same, which terminates in a lip 28 projecting upwardly from the extreme edge thereof. A guard 29 on the case 10 issues inwardly from the walls thereof and overlies the lip 28, thereby protecting the same and at the same time being spaced therefrom to retard transmission of heat from the kettle to the case. The kettle 18 is supported on the angle frame members 17.

The channel 23 is arranged to provide a straight run 32 which commences in close proximity to wall 12 and follows along wall 13. The channel 23 at the end of run 32 makes a curve 33, which leads into another straight run 34 following along the wall 11. At the end of this run the channel has another curve 35 which leads into still another straight run 36, which follows along the wall 14. At the end of the run 36 the channel is constructed with a loop 30 which communicates with a diagonal run 130. This latter run is connected through a curved run 37 with another straight run 38, which latter run is connected through a curved run 39. Run 39 communicates with a straight run 41 which is parallel with the run 32. The run 41 discharges into a reservoir 42 which is merely an enlargement of said run. From this reservoir a short run 43 is provided which is connected through a curved run 44 with the beginning of the run 32.

The larger portion of kettle 18 is enclosed by means of a hood 45. This hood utilizes the uprights 15 at the end wall 11 and two other uprights 46 which are attached to the case 10 at the locality of the end of the major portion 25 thereof. The construction of the hood, not forming any particular feature of the invention, has not been shown in detail though it can readily be comprehended that any suitable construction may be used for the purpose.

In the reservoir 42 is provided a vertical tubular duct 47 which communicates at its lower end with the reservoir 42. In this duct is disposed a propeller or elevator 48 which is mounted on the armature shaft of a motor 49. The duct 47 communicates at its upper end with the run 43 of the channel 23, thus discharging the cooking liquid from the reservoir 42 and into the run 43 of the channel, from which it flows throughout the course of the channel and is returned into reservoir 42.

At the lowermost portion of the reservoir 39 is arranged a clean out 51, which also serves as a sump for collecting crumbs and other solid material formed in the operation of the machine. This construction forming no particular feature of the invention has not been illustrated in detail.

Situated at the beginning of the run 32 of channel 23 is a doughnut former 64, which comprises a receptacle 65 for dough and a cutter 66 connected therewith. Such construction being well known in the art will not be described in detail in this application. The cutter 66 includes a flanged sleeve 67 which serves dough extrusions from the mass contained in receptacles 65. This sleeve is reciprocated in opposite directions by means of a forked arm 68, which is mounted on a shaft 69. Shaft 69 is operated by a motor 70 and a transmission enclosed with a transmission housing 71. These parts will be subsequently more fully described.

In the run 36 of channel 23 is arranged a twisted tubular turner 72. This turner inverts the doughnuts after the same have been cooked a predetermined length of time so that the said doughnuts may be cooked equally on both sides thereof.

For removing the cooked doughnuts from the machine an ejector 73 is employed which is disposed in the run 38 of channel 23. This ejector comprises a shaft 74 which is constantly driven from the transmission within the housing 71. This shaft has mounted on it oppositely extending cranks 75 and 76. Sets of toothed blades 77 and 78 are mounted on the said cranks and are adapted to be alternately raised and lowered as the shaft 74 rotates. The lower ends 79 of these blades slide upon an inclined rest 81 which is mounted on the bottom 19 of the receptacle 18 in the portion of the run 41 leading from the run 39. It will readily be comprehended that, as the doughnuts reach the said blades, the doughnuts are elevated and progressed upwardly and outwardly of the cooking kettle 18. The ejector 73 is disposed within a trough 82 constructed with two side plates 83 and 84 and a bottom 85 at the discharge end thereof, which directs the doughnuts upon leaving the ejector outwardly of the machine.

For controlling the elevation of the cooking liquid in the channel 23 a dam 91 is used which extends across the run 38 of channel 23, at the locality of the beginning of the reservoir 39. The cooking liquid in flowing through the channel 23 passes over this dam, which serves as a weir and is maintained at a predetermined elevation thereby.

The transmission within the case 71 utilizes the motor 70 previously referred to. This motor is constructed with an armature shaft 91 which has attached to the end thereof a worm 92. Worm 92 meshes with a worm wheel 93 fast on a shaft 94, best shown in Fig. 1. This shaft is journalled in bearings 95 formed on the case 71. Shaft 94 has attached to it a worm 96 which meshes with a worm wheel 97, fast on a vertical shaft 98. Vertical shaft 98 is journalled in a bearing 99 in the form of a bracket issuing outwardly from one of the walls of the case 71 and in another bearing 105 formed on the bottom of the case 71. This shaft also carries a Geneva gear 101 which meshes with a corresponding Geneva gear 102 on another vertical shaft 103. This shaft is journalled in a single bearing 104, similar to the bearing 99. The lower end of the shaft 103 has secured to it a crank 106 which is pivotally connected to a connecting rod 107, best shown in Fig. 4. This connecting rod is in turn pivoted to a head 108 attached to the end of a reciprocating rod 109. Rod 109 is slidable mounted in a guide 111 attached to the transmission case 71 and in another guide 112 attached to the portion 22 of kettle 18.

The shaft 69 operating the cutter 64 is journalled in two bearings 113 and 114 in the case 71. This shaft has attached to it an arm 115 which has mounted on the end of it a roller 116. Roller 116 is adapted to engage a cam 117, formed on the gear 102. As the said gear rotates shaft 69 is oscillated and the cutter 64 operated. The roller 116 is maintained in contact with cam 117 by means of a compression coil spring, not shown in the drawings. This coil spring is enclosed within a case 118 anchored to one of the walls of the case 71 and bears against a head 119, pivoted to an arm 121, secured to shaft 69, which arm is best shown in Fig. 4. Case 118 slides in a boss 120 formed on the case 71.

The shaft 74, operating the ejector 73, is journalled in bearings 122 and 123 formed in the case 71. Shaft 74 has attached to it within case 71 a spur gear 124. This spur gear meshes with another spur gear 125, mounted on the shaft 94. By means of this transmission the shaft 74 is continuously rotated and the blades 77 and 78 alternately reciprocated to procure the elevation of the doughnuts from the channel 23.

The invention proper comprises a structure, best shown in Fig. 1. The curved portion 35 of the channel 23 is off-set from the portion 36 of said channel to provide a pocket 126. Extending across this pocket is a grid 127. The doughnuts, in travelling along the portion 34 of the channel 23, are directed against the grid 127 and so remain due to the current of the cooking liquid being in that direction. The cooking liquid continues past the grid 27 and around the curved portion 35 and into the pocket 126 from which it emerges into the portion 36 of the channel and then continues through the turner 72 and the rest of the machine. Due to the position of the doughnut at the grid 127 the same remains stationary.

At the end of the run 130 of the channel 27 is provided the curved portion 37, previously referred to, which is similar to that indicated at 35. A grid 128 extends across the same and provides a pocket 129 in said curved portion. The grid 128 operates in the same manner as grid 127 and retards movement of the doughnuts directed against it by the current in the channel 130. The cooking liquid upon arriving at the grid causes the doughnuts to remain against it and said cooking liquid travels through the grid and into the pocket 129 from which the cooking liquid emerges and enters the portion 38 of channel 23 and passes through the remainder of said channel.

For releasing the doughnuts trapped at the grids 127 and 128, a releasing device 131 is employed, which is best shown in Fig. 1. This releasing device comprises two arms 132 and 133 which are angularly related with respect to one another and which are connected to a hub 134. These arms are pivoted on a pintle 135 passing through the hub 134 and secured to a bracket 140 attached to the ledge 27 of the kettle 18. The arm 132 has attached to it a depending finger 136 in the shape of an angle which is adapted to normally lie in a recess 139 formed in the kettle at the edge of the portion 34 of the channel 23. In a similar manner, the arm 132 is attached to a depending finger 137 which is adapted to normally lie within a recess 138 formed in the kettle along one of the walls of the portion 30 of the channel 23. These two fingers are adapted to engage the doughnuts trapped against the grids 127 and 128 and to shift the same away from said grids and into the current of the cooking liquid beyond the same when the arms 132 and 133 are swung in a counter-clockwise direction to the position shown in dotted lines in Fig. 1. When the arms are in the position shown in dotted lines in Fig. 1 the fingers 136 and 137 also hold back the remaining doughnuts.

For swinging the arms 132 and 133, a link 141 is employed which is pivotally connected at 142 to the arm 133. This link is also connected at 143 to the sliding rod 109, previously referred to, which is guided for reciprocating movement in the bearing 112 attached to the portion 22 of kettle 18, and in the bearing 111 formed on the case 71 of the transmission. The rod 109 is reciprocated by the crank 106, as previously brought out to swing the two arms 132 and 133 in a manner to manipulate the doughnuts.

The operation of the invention is as follows: Normally the two fingers 136 and 137 are disposed within the recesses 139 and 138. When the gear 102 is operated by the gear 101, the crank 106 causes the rod 109 to reciprocate at the same time the cam 117 engages cam roller 116 and rocks shaft 29. This causes the formation of a doughnut and the shifting of the doughnuts trapped against the grids 127 and 128 into the current of the cooking liquid where the same continues to travel. Due to the fact that the fingers 136 and 137 are angle shape the same engage the oncoming doughnuts and hold the same back until the said fingers may be retraced into the recesses 139. Thereafter the following doughnuts are progressed in the way until the same reach the grids 127 and 128 at which time the said doughnuts are arrested and remain until the device again operates. Inasmuch as the ejector 73 operates continuously the same elevates the doughnuts as soon as the same are released by the finger 137.

Figure 6:
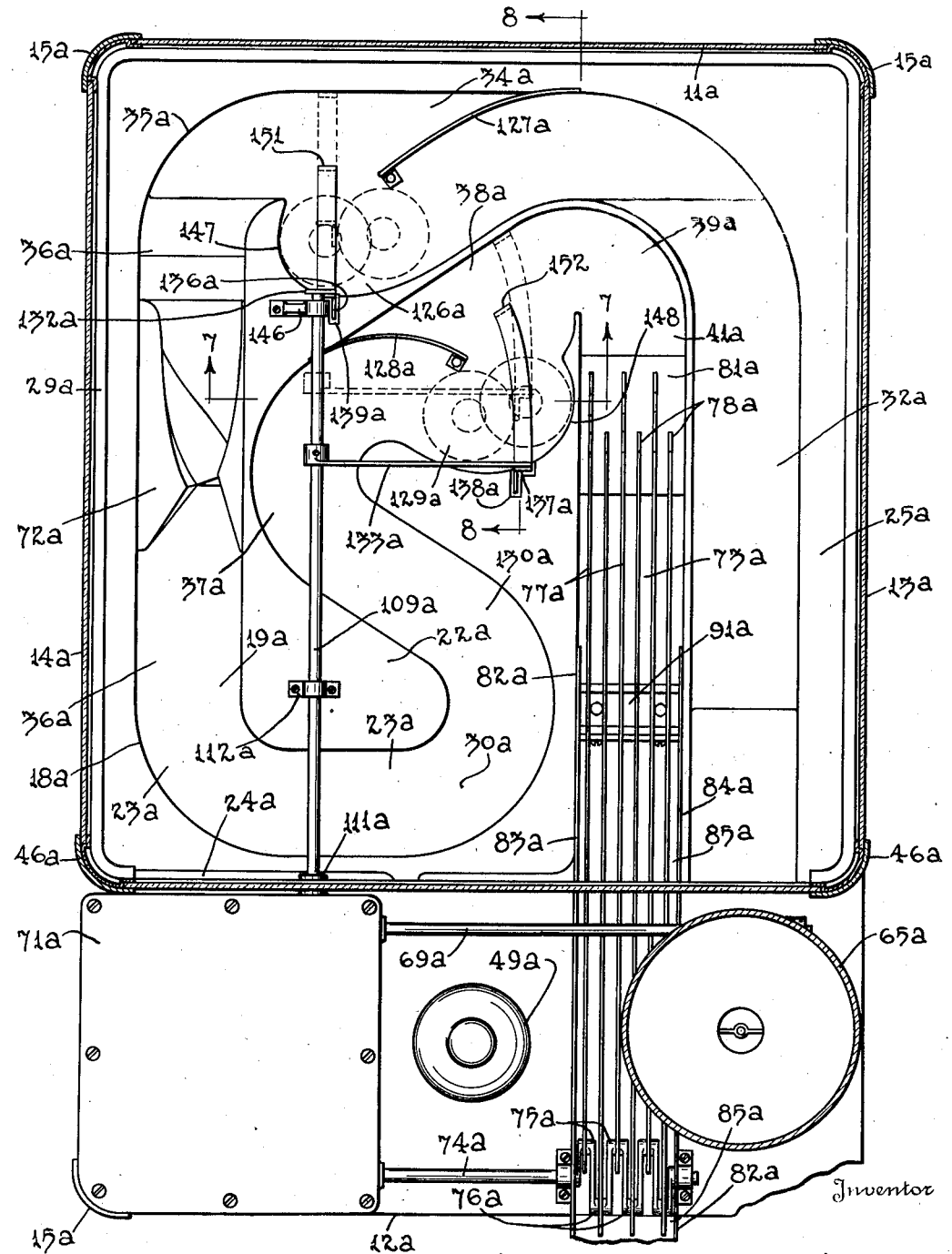
Fig. 6 is a view similar to Fig. 1 of a modification of the invention.

In Figs. 6, 7 and 8 I have shown a modification of the invention. Inasmuch as certain of the parts of the invention are identical with those described in connection with the structure shown in Figs. 1 to 5, the description thereof will not be repeated and corresponding parts will be designated by the same reference numerals to which the suffix "a" will be added.

In the form of the invention shown in Fig. 6 the channel 23a is so arranged that the pockets 126a and 129a are disposed laterally of the portions 34a and 38a of the channel 23, instead of at the ends of the said runs of the channel. The grids 127a and 128a of this form of the invention do not extend across the ends of the channels but extend diagonally from the walls of the channel and up toward the pockets 126a and 129a to direct the doughnuts passing through said channels out of the channels and into the said pockets. It will also be noted that the pockets 126a and 129a are formed with end walls 147 and 148, absent from the other form of the invention and against which the doughnuts engage. Inasmuch as the tendency of the current of the liquid is to travel in a straight line, the current passes directly along the run 34a and into the run 36a by-passing the pocket 126a. This causes the doughnuts entering the said pocket to remain in the pocket and against the wall 147 thereof until released, as will be presently described. The same is true with the doughnuts entering the pocket 129a.

For shifting the doughnuts out of the pockets 126a and 129a fingers 136a and 137a are employed which are similar to the fingers 136 and 137. These fingers normally lie in recesses 139a and 138a which are formed in the kettle 18 directly opposite the doughnuts disposed therein. The two fingers are attached to arms 132a and 133a which are directly attached to the rod 109a instead of being pivotally mounted. The rod 109a is guided for reciprocating movement in three guides 111a, 112a and 146, the former being formed on case 71a and the two latter being attached to kettle 18a. The arms 132a and 133a are so designed that they support the fingers 136a and 137a at the proper positions to engage the doughnuts. When the rod 109a is reciprocated by means of the transmission within the case 71a, as described in connection with the form of the invention shown in Fig. 1, both of the doughnuts trapped in the pockets 126a and 129a are rejected therefrom and into the current of the cooking liquid travelling along the runs 134a and 130a of the channel 123a. The doughnuts, thereupon, passing to the turner 72a and to the ejecting device 73a as previously described.

The fingers 136a and 137a have attached to them other fingers 151 and 152 which are spaced therefrom to receive the doughnuts therebetween. These fingers prevent accidental movement of the doughnuts out of the pockets 126a and 129 prior to manipulation of the fingers 136a and 137a.

In Figs. 9 and 10 I have shown another modification of the invention. Inasmuch as certain of the parts of the invention are identical with those described in connection with the structure shown in Figs. 1 to 5, the description thereof will not be repeated and corresponding parts will be designated by the same reference numerals to which the suffix "b" will be added.

In this form of the invention the channel 23b is provided with two return bends 35b and 37b instead of the curved portion shown in Fig. 1, which bends communicate with the straight runs 34b and 41b. Grids 127b and 128b extend across the pockets 126b and 129b, formed by said bends. In this form of the invention the doughnuts are shifted laterally from one channel to the other across the bends.

In the form of the invention shown in Fig. 9 the finger 137b is provided with another finger 153 spaced therefrom. This finger is connected to the finger 137b by a bar 153b and prevents the doughnuts from sliding out of the channel in which they are retained until the arm 133a is manipulated. A similar finger 154 is used in conjunction with the finger 136b. The finger 154 is attached to a bar 155. This bar is slidably mounted at one end in a guide 156 attached to kettle 18b. The other end of this bar is pivoted at 157 to the arm 132b. By means of this construction the finger 154 is held in obstructing position when finger 136b is disposed in recess 139b and is moved out of obstructing position when the parts are arranged as shown in dotted lines in Fig. 9. The method of operating the arms 132a and 133a is similar to that previously described.

The advantages of my invention are manifest. With my improved control device a single movable member may be used with each control device. The doughnuts are maintained in position by engagement with a fixed member and are disengaged by movement out of such position through the action of a movable member. This movable member need not move at any particular rate of speed. With my invention the doughnuts are admitted, one at a time, so that positive control thereof may be had. With my improved control device the mechanism is disposed entirely above the cooking liquid so that clogging of the parts thereof is entirely prevented. The invention can be constructed at a nominal cost and is practically fool-proof.

Changes in the specific form of my invention, as herein disclosed, may be made within the scope of what is claimed without departing from the spirit of my invention.

Having described my invention, what I claim as new and desire to protect by Letters Patent is:

1. In a doughnut machine in which the doughnuts are progressed along a way through the flow of the cooking liquid, means forming an obstruction in said way for obstructing the travel of doughnuts in the way, and a movable member for engaging the doughnuts and moving the same out of engagement with said obstruction and to a position in said way in which further progression occurs.

2. In a doughnut machine in which the doughnuts are progressed along a way through the flow of the cooking liquid, a member fixed in said way and forming an obstruction for obstructing the passing of the doughnuts along the way, and a movable member for engaging the doughnuts and moving the same laterally out of engagement with said obstruction.

3. In a doughnut machine in which the doughnuts are progressed through the flow of the cooking liquid along a way having a pocket therein, a grid at the locality of said pocket for controlling the position of the doughnuts at the pocket and a movable member for moving the doughnuts from their position at the pocket and back into the way.

4. In a doughnut machine in which the doughnuts are progressed through the flow of the cooking liquid along a way having an off-set therein, a grid for directing doughnuts from said way and into said off-set, means at said off-set for obstructing the travel of doughnuts, and a movable member for engaging the doughnuts in the off-set and moving the same back into the way.

5. In a doughnut machine in which the doughnuts are progressed through the flow of the cooking liquid along a way having an enlargement therein, an obstruction in a portion of said enlargement, a doughnut travelling along said way and reaching said obstruction being obstructed from movement thereby, and a movable member for moving the doughnut past said obstruction and into another part of the way in which progression occurs.

6. In a doughnut machine in which the doughnuts are progressed through the flow of the cooking liquid along a way, obstructing means extending transversely of said way and against which the doughnuts impinge upon travelling through the way, and a member moving parallel with said obstructing means to move the doughnut into another portion of the way in which progression occurs.

7. In a doughnut machine in which the doughnuts are progressed through the flow of the cooking liquid along a way having a portion in which the flow of the cooking liquid is negligible, means for directing a doughnut from the way and into said portion of the way, and a movable member for moving the doughnuts from said portion of the way and back into the portion of the way along which the cooking liquid flows.

8. In a doughnut machine in which the doughnuts are progressed through the flow of the cooking liquid along a way, an obstructing member in said way, said way being arranged so that a run of the channel leads up to said obstructing member and another run leads away from said obstructing member, the current of said first named run tending to hold a doughnut against said obstruction, and means for moving the doughnut from the first run and away from said obstruction to said second run.

9. In a doughnut machine in which the doughnuts are progressed through the flow of the cooking liquid along a way having a bend therein connected by two runs, a grid extending across said bend and against which a doughnut carried by the first run impinges, and means for shifting the doughnut from the first run to the second run.

10. In a doughnut machine in which the doughnuts are progressed through the flow of the cooking liquid along a way having a return bend connected by two runs, a grid extending across said bend between the opposite walls of said runs and against which a doughnut carried in the first run impinges and means movable along said grid for shifting the doughnut from the first run to the second run.

11. In a doughnut machine in which the doughnuts are progressed through the flow of the cooking liquid along a way having two connected runs extending in different directions, a movable member for holding the doughnut from movement from one run and into the other, said member being disposed between said runs and means for shifting said member out of engaging position and for moving the doughnut from the first run and into the second run.

12. In a doughnut machine in which the doughnuts are progressed through the flow of the cooking liquid along a way having two runs one off-set relative to the other, a pair of spaced fingers between which a doughnut may enter in travelling along the first run and means for simultaneously moving the fingers to shift the doughnut to the second run.

ALEXANDER S. T. LAGAARD.